United States Patent [19]

Bain

[11] Patent Number: 5,893,532

[45] Date of Patent: Apr. 13, 1999

[54] CURVED WEAR SURFACE FOR HELICOPTER SKID SHOES

[76] Inventor: Roy L. Bain, 10160 Cribari Dr., Yucaipa, Calif. 92399

[21] Appl. No.: 08/935,099

[22] Filed: Sep. 25, 1997

[51] Int. Cl.$^6$ .................................................. B64C 25/52
[52] U.S. Cl. ..................... 244/108; 244/17.11; 244/17.17
[58] Field of Search .................... 244/17.17, 108, 244/17.11; 188/5

[56] References Cited

U.S. PATENT DOCUMENTS

| | | |
|---|---|---|
| 3,395,879 | 8/1968 | Bayliff et al. . |
| 4,544,116 | 10/1985 | Shwayder . |
| 5,211,359 | 5/1993 | Rene et al. . |
| 5,224,669 | 7/1993 | Guimbal . |
| 5,358,201 | 10/1994 | Brown . |

*Primary Examiner*—Charles T. Jordan
*Assistant Examiner*—Tien Dinh
*Attorney, Agent, or Firm*—Harry G. Weissenberger

[57] ABSTRACT

A wear surface for helicopter shoes is constructed by forming a railed enclosure on a curved base plate, placing a mosaic of smooth-surfaced tungsten carbide blocks on the base plate within the enclosure, brazing the blocks to the plate and rails, and grinding the rails to form a smooth, edgeless transition between the wear surface and the plate surface.

5 Claims, 5 Drawing Sheets

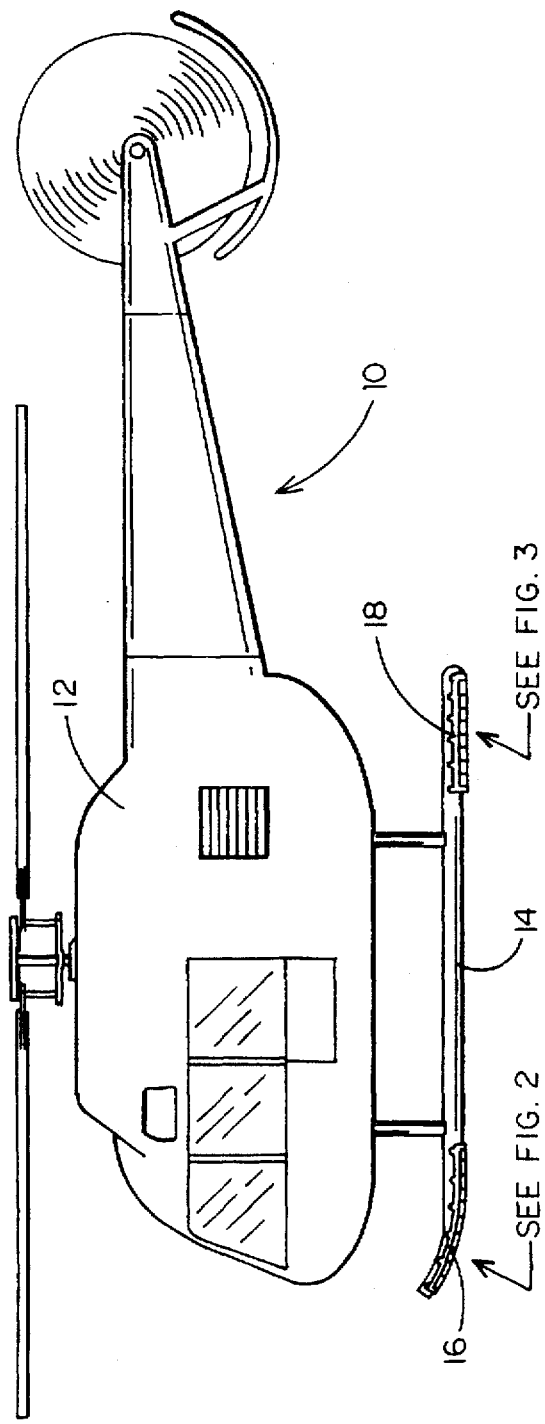
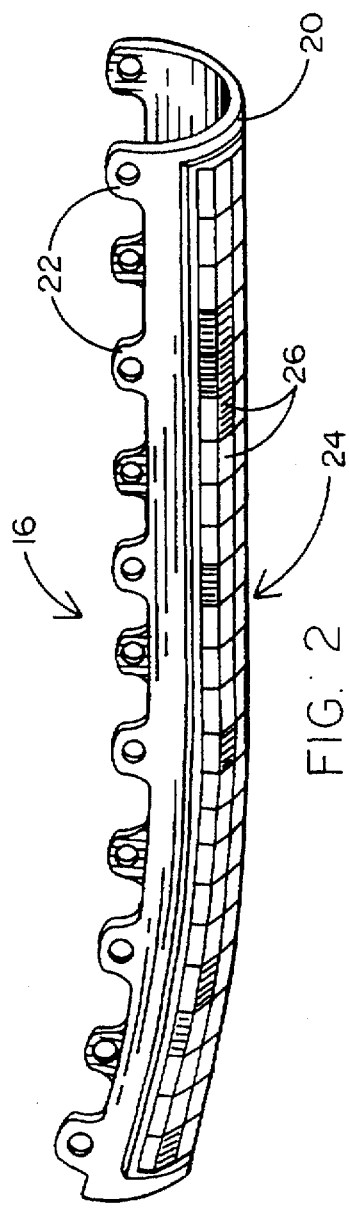
FIG. 1
FIG. 2

CURVED WEAR SURFACE FOR HELICOPTER SKID SHOES

FIELD OF THE INVENTION

This invention relates to wear surfaces for withstanding strong frictional forces, and more particularly to curved skid shoes for helicopters.

BACKGROUND OF THE INVENTION

The skids on which helicopters rest when they are on the ground are exposed to severe wear because helicopters generally do not land exactly vertically but rather with a certain amount of forward or sideways motion. This imposes a considerable frictional stress on the skids when the helicopter touches the ground. Skids are expensive components and have weight limitations; consequently, it has been customary to attach wear-resistant skid shoes to the underside front, center and rear, or even the entire length of the skid tubes. These shoes typically have a welded hard-faced surface, and they are readily replaceable when they wear through.

As shown in U.S. Pat. No. 4,544,116 to Shwayder, it has previously been proposed to use as helicopter shoes a steel channel containing crushed tungsten carbide particles in a copper-based binder. Similarly, in U.S. Pat. No. 3,117,845 to Reed, a steel plate is coated with a coating of tungsten carbide particles distributed in a copper-based binder and covered with a flame-sprayed copper-nickel alloy.

The prior art wear surfaces described above have several disadvantages. For one, the crushed tungsten carbide particles embedded in a softer binder form a rough surface which produces considerable friction. This is undesirable because a pilot has better control over the helicopter if it slides smoothly on the ground when landing. Secondly, both the channel of U.S. Pat. No. 4,544,116 and the plate of U.S. Pat. No. 3,117,845 have sharp side edges. These can catch in a gouge or groove in a runway surface when there is a transverse component to the helicopter's motion on landing, and cause a serious accident. Thirdly, as the surface wears, tungsten carbide particles break loose from the binder and reduce the life of the shoe. Fourthly, the clamp mounting of U.S. Pat. No. 4,544,116 is unsatisfactory because it allows the shoe to shift on the skid under strong impacts.

It has previously been proposed in the street sweeping industry to braze small blocks of tool-tip grade tungsten carbide into a groove milled in a sweeper drag shoe. This approach, however, is unsuitable for helicopter skids because it suffers from the same disadvantages as the channel of U.S. Pat. No. 4,554,116. Furthermore, tool-tip grade tungsten carbide tends to fracture under the impact of a helicopter landing.

There consequently exists a need for a smooth, wear-resistant helicopter skid shoe that has no sharp edges that can catch on lateral movement, and that can be bolted directly to the skids.

SUMMARY OF THE INVENTION

The present invention fills the above-identified need by providing a skid shoe in which a mosaic of smooth-surfaced impact-resistant tungsten carbide blocks is brazed onto a steel base curved around the axis of the skid. Front shoes are additionally curved to follow the curvature of the front end of the skid. During manufacture, the carbide blocks are held on the steel base by steel rails or other barriers that are then ground to an edgeless taper. The blocks are separated from each other by a thin wall of ductile nickel brazing material that is flowed between the blocks to further prevent the blocks from breaking on impact. A manufacturing method is disclosed which results in a strong, unitary shoe construction and is also usable for the recycling and rehabilitation of worn skid shoes, as well as for the manufacture of curved wear surfaces in general.

BRIEF DESCRIPTION OF THE DRAWINGS

FIG. 1 is a side elevation of a helicopter showing the location of the skid shoes of this invention;

FIG. 2 is a perspective view of a front skid shoe for the helicopter of FIG. 1;

DESCRIPTION OF THE PREFERRED EMBODIMENT

FIG. 1 shows a helicopter 10 whose body 12 rests on skids 14 when on the ground. The skids 14 are held spaced from the ground by skid shoes 16, 18 attached to the underside of the skids 14 in the front and rear. Additional skid shoes may be attached to the central portion of skids 14 if desired.

Figure 3:
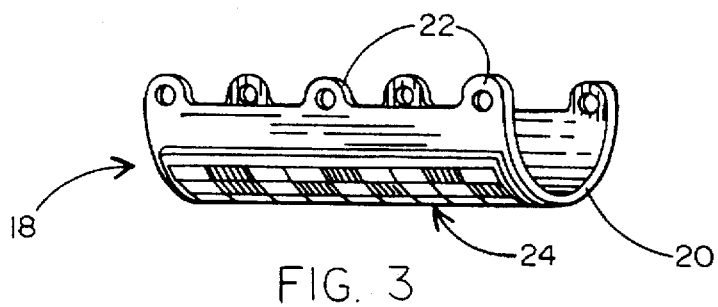
FIG. 3 is a perspective view of a rear skid shoe for the helicopter of FIG. 1.

As best seen in FIGS. 2 and 3, the skid shoes 16, 18 are built on a curved base 20, preferably of steel, which is shaped to conform to the circumference and longitudinal bend of the skids 14. The base 20 preferably has integral ears 22 which can receive appropriate bolts for bolting the shoes 16, 18 to the skids 14.

The wear surface 24 of the shoes 16, 18 follows the curvature of the base 20 through an arc which is determined by the intended use of the helicopter but may typically vary between about 20° for normal travel usage and about 40–50° for training usage. The wear surface 24 is formed of a mosaic of virgin tungsten carbide blocks 26 with a smooth, uniform surface. The material of the blocks 26 is preferably 89% tungsten carbide of mixed grain size and 11% cobalt, with a density of about 14.5 gm/cc.

The blocks 26 are preferably rectangular in shape and are oriented in the longitudinal direction of the shoe. The dimensions of the blocks 26 are chosen so as to maximize the wear surface of each block 26 while minimizing the bending stress imposed upon the block 26 by expansion, contraction or changes in the curvature of the base 20 as a result of temperature changes and mechanical stresses. Typically, the blocks 26 may be about 20×10×3 mm in size.

Figure 4:
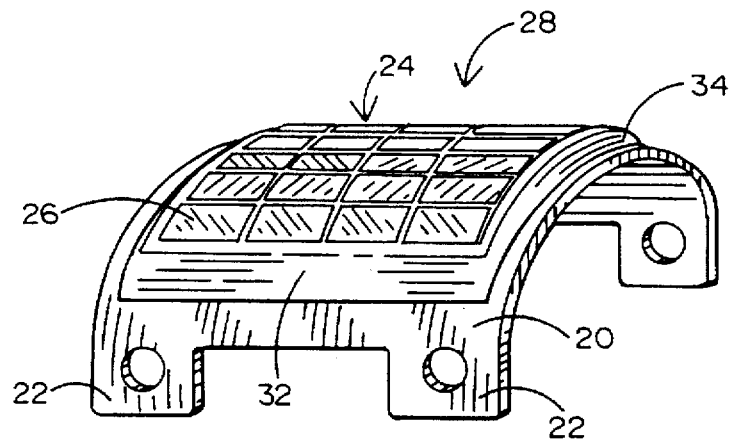
FIGS. 4 and 5 are perspective views of other embodiments of the invention illustrating the taper of the retaining rails.
Figure 5:
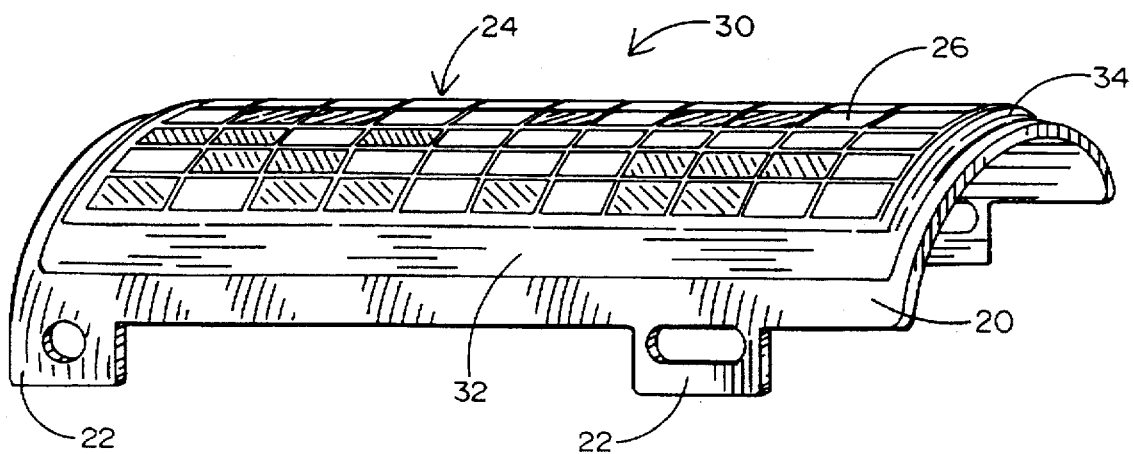

FIGS. 4 and 5 illustrate skid shoe configurations 28 and 30, respectively, to fit various types of commercial helicopters. Each of these figures shows the base 20 which bolts to the skids 14 of FIG. 1; the wear surface 24 composed of tungsten carbide blocks 26; and tapered side rails 32 and end rails 34 which provide a gradual, edgeless transition in all directions from the elevated wear surface 24 to the surface of base 20.

Figure 6:
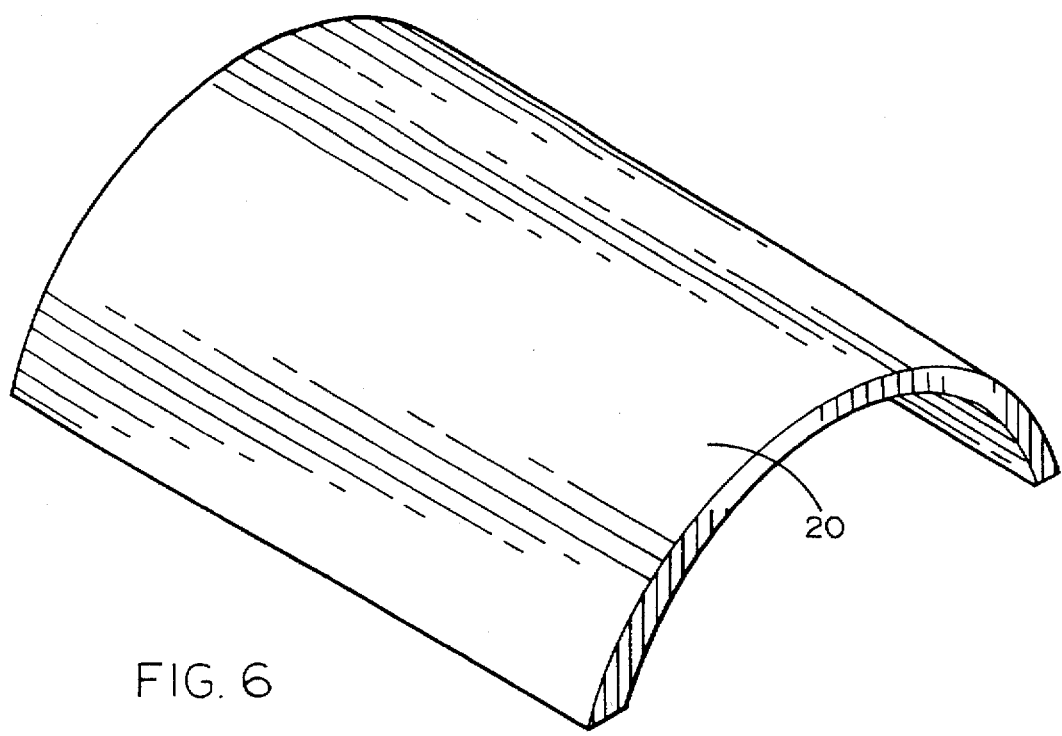
FIGS. 6–11 are perspective views illustrating the successive steps in the manufacture of a curved wear surface according to the invention.
Figure 7:
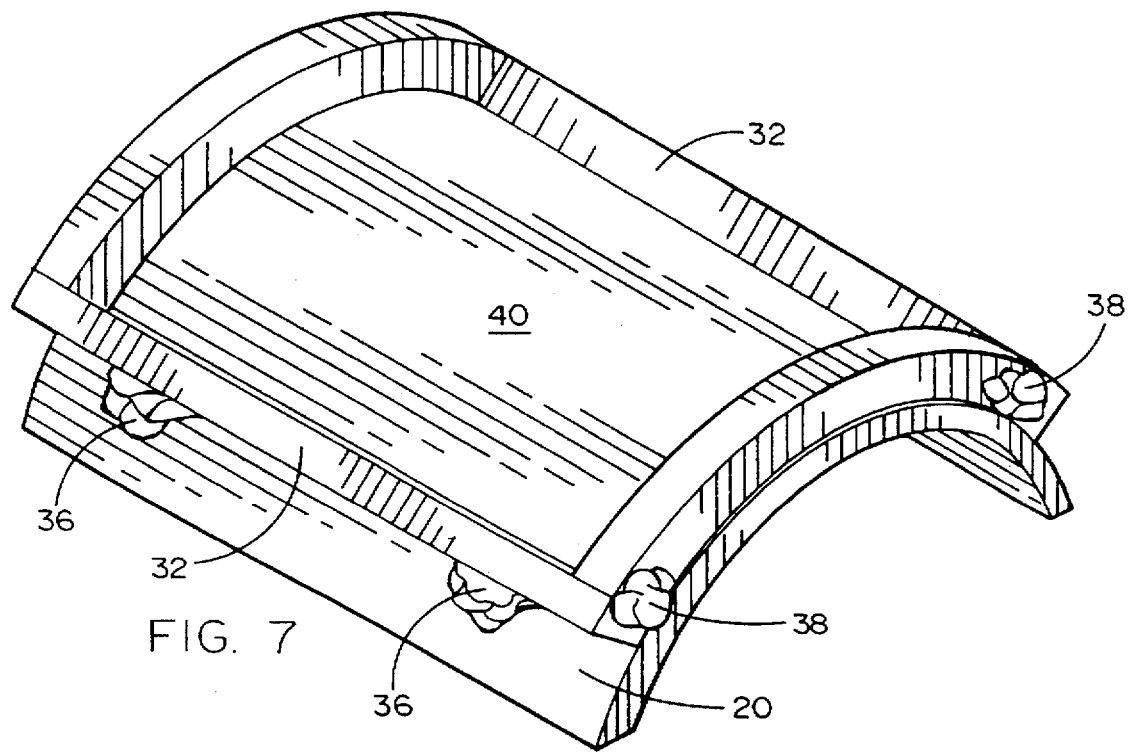

FIGS. 6 through 11 illustrate a preferred method of manufacturing the skid shoes of FIGS. 2 through 5 or other curved wear surfaces. In FIG. 6, a curved steel base plate 20 is shown in generic form, i.e. without the mounting ears 22 of FIGS. 2 through 5. In FIG. 7, steel side rails 32 are first spot welded at 36 to the base plate 20. Curved steel end rails 34 are then spot welded to the side rails 32 at 38.

With the rails 32, 34 thus in place, the interior of the enclosure 40 formed by the rails 32, 34 is coated with an appropriate brazing flux, preferably a water and salt flux active at 760–1200° C. such as Welco 17 flux. Both the base plate 20 in the enclosure 40 and the inner surfaces of the rails 32, 34 are so coated. The area of the plate 20 outside the rails 32, 34 is coated with an anti-adhesion compound such as Stop-Off™ to prevent brazing material from adhering to it.

Figure 8:
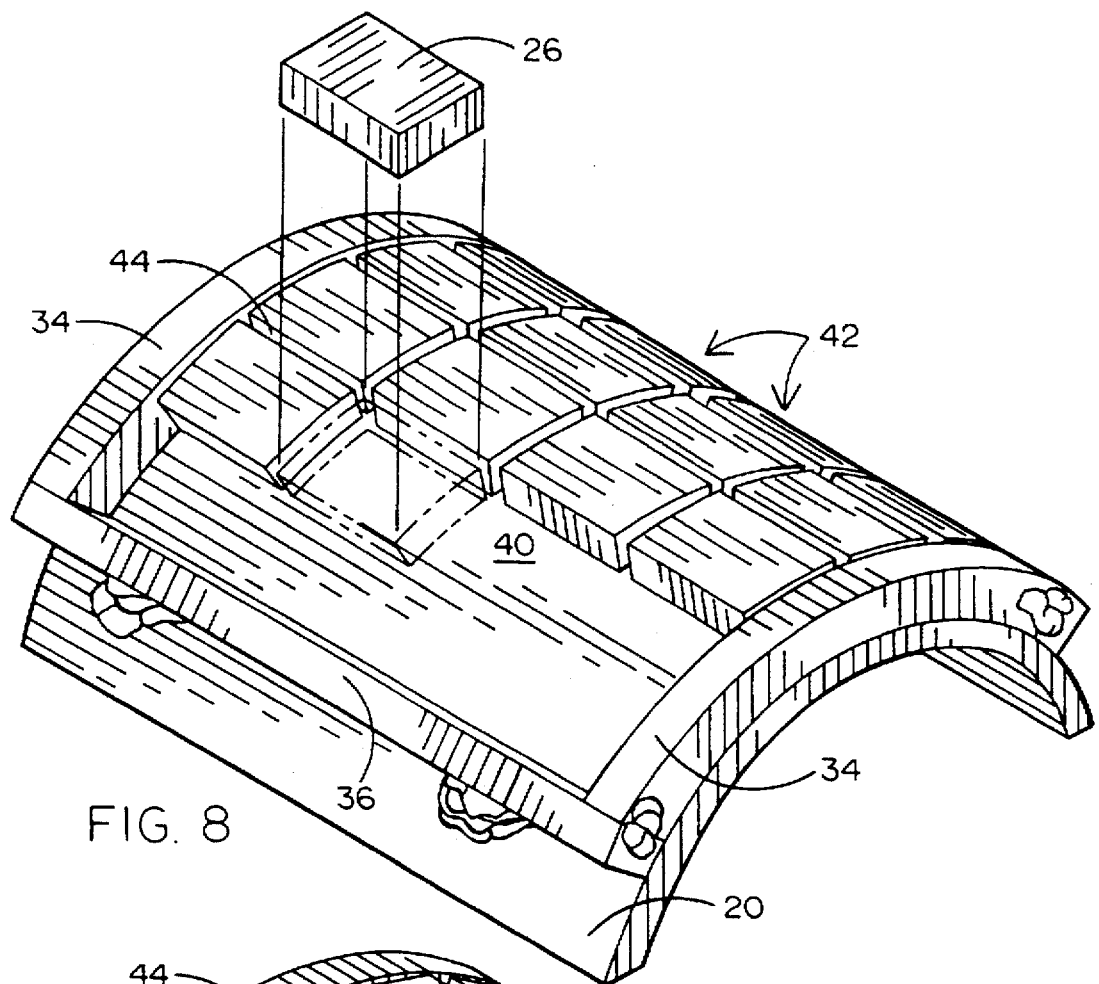
Figure 9:
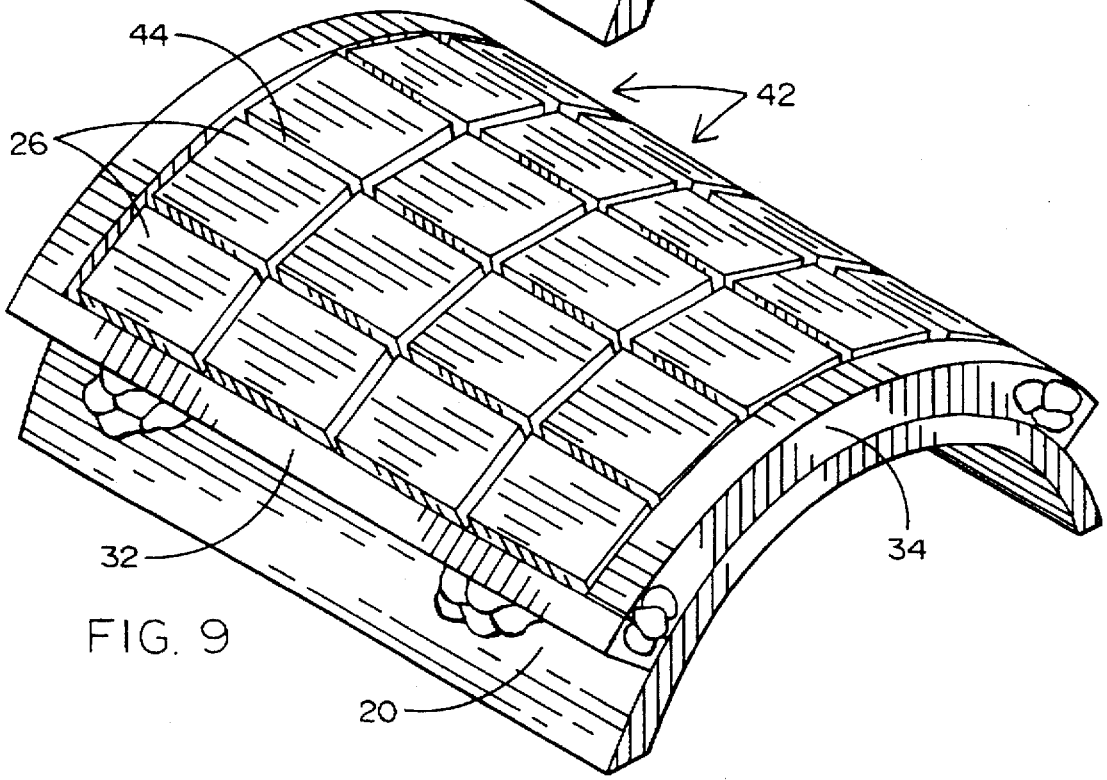
Figure 10:
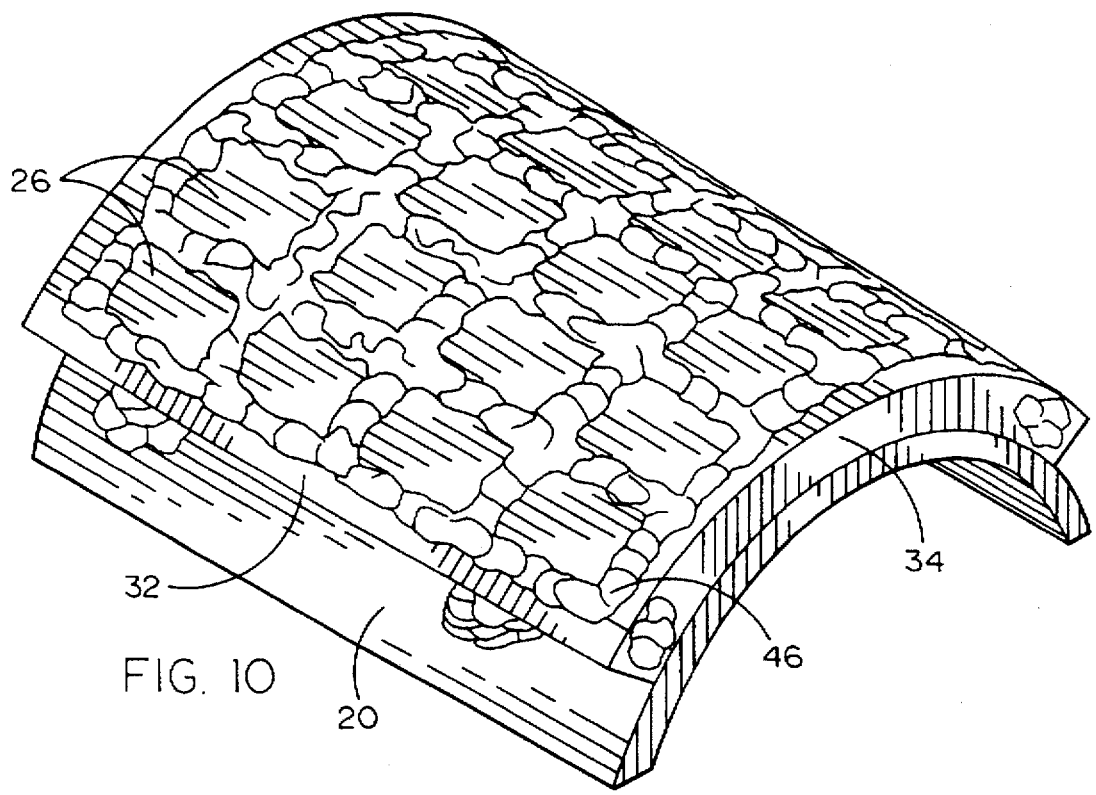

The tungsten carbide blocks 26 are now placed into the enclosure 40 as shown in FIG. 8. Because the side faces of adjacent blocks 26 in a circumferential row such as 42 are not quite parallel, due to the curvature of the plate 20, a small space 42 will naturally exist between the side faces of the blocks 26 in the row 42. Adjacent rows 42 are slightly spaced from each other and from the end rails 34 by judicious placement of the blocks 26. The final arrangement of the blocks 26 in the enclosure 40 is shown in FIG. 9. It should be noted that the rails 32, 34 are at least as high as the blocks 26, for a purpose detailed below.

When the blocks 26 are in place, they are coated with flux, and a nickel brazing material 46 with a melting temperature of about 925° C. and a tensile strength of about 278,000 kg/cm$^2$, such as Welco 17 Bare, is flowed (FIG. 10) over the enclosure 40 along the spaces between the blocks 26, and along the rails 32, 34. The braze seeps underneath the blocks 26 and the rails 32, 34, thus providing a flat metallic bed for each block 26 to rest on. The braze 46 also fills the spaces along the side and end faces of the blocks 26 to form a solid yet somewhat ductile wear surface 24. The filling of all spaces under the blocks 26 and the rails 32, 34 prevents water and other substances from penetrating the enclosure 40 Under the blocks 26 and corroding the block-supporting steel plate 20.

Figure 11:
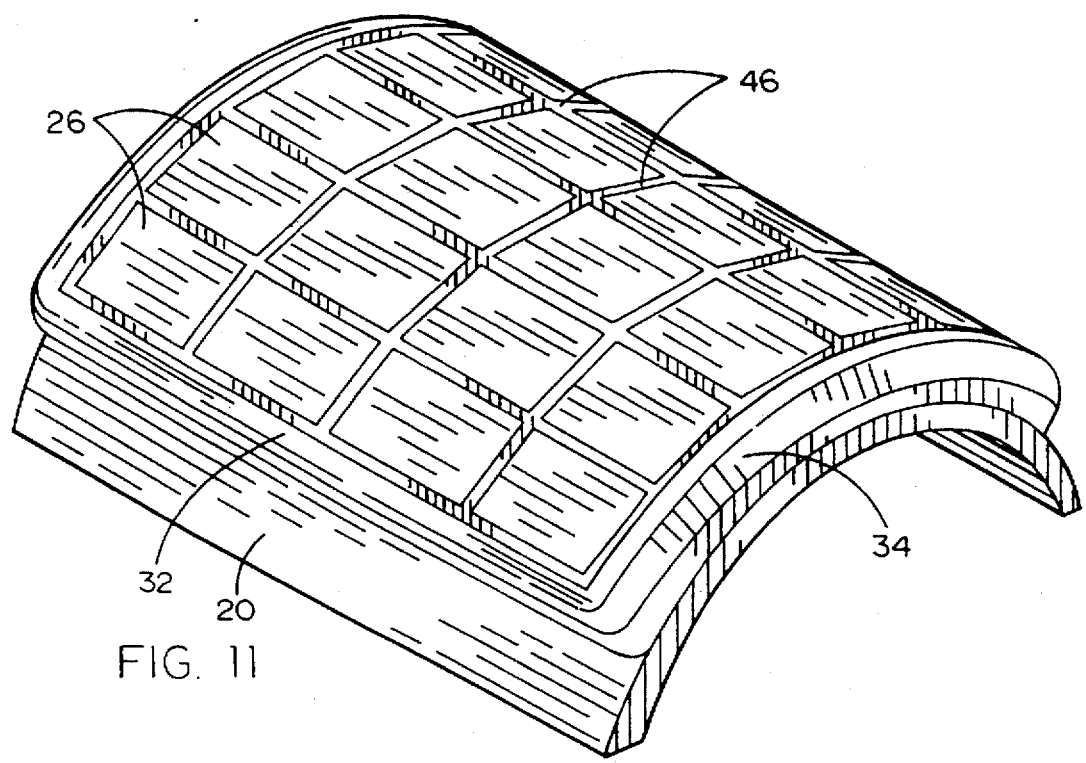

The manufacture of the shoe is completed (FIG. 11) by grinding away all nickel braze 46 above the surface of the blocks 26, and grinding the rails 32, 34 into the edgeless tapered shape shown in FIGS. 4, 5 and 11. For this operation, the rails 32, 34 must be at least as high as the surface of blocks 26 so that they can be ground down even with that surface, thereby avoiding the formation of a hard 90° edge on the outermost blocks 26. The tapered rails 32, 34 and the portion of the plate 20 outside the rails 32, 34 may finally be painted as desired with a protective paint.

The present invention is useful not only in the manufacture of skid shoes and other curved wear surfaces, but also in the recycling and rehabilitation of worn-out steel skid shoes. Because the exact curvature of the base plate 20 is not critical (and can include curvature in a plurality of mutually orthogonal planes) in the manufacturing process of FIGS. 6–11, the wear surface of this invention can be built up even on worn or patched base plates.

It is understood that the exemplary curved wear surface described herein and shown in the drawings represents only a presently preferred embodiment of the invention. Indeed, various modifications and additions may be made to such embodiment without departing from the spirit and scope of the invention. Thus, other modifications and additions may be obvious to those skilled in the art and may be implemented to adapt the present invention for use in a variety of different applications.

I claim:

1. A helicopter skid shoe comprising:
   a) a base plate;
   b) a mosaic of smooth-surfaced blocks of wear-resistant material disposed on said base plate to form a substantially continuous smooth wear surface;
   c) retaining rails surrounding said mosaic on said plate, said rails being tapered to provide an edgeless transition from said wear surface to the surface of said base plate outwardly of said mosaic.

2. The helicopter skid shoe of claim 1, in which said base plate is curved.

3. The helicopter skid shoe of claim 2, in which said base plate is curved in a plurality of directions.

4. The helicopter skid shoe of claim 1, in which said blocks are brazed to said base plate, to said retaining rails, and to each other.

5. The helicopter skid shoe of claim 1, in which said wear resistant material contains substantially 89% tungsten carbide and 11% Cobalt.

* * * * *